(12) United States Patent
Cappello et al.

(10) Patent No.: US 12,488,794 B2
(45) Date of Patent: Dec. 2, 2025

(54) APPARATUS AND METHOD FOR ANALYSIS OF AUDIO RECORDINGS

(71) Applicant: Sony Interactive Entertainment Inc., Tokyo (JP)

(72) Inventors: Fabio Cappello, London (GB); Danjeli Schembri, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 338 days.

(21) Appl. No.: 17/452,499

(22) Filed: Oct. 27, 2021

(65) Prior Publication Data

US 2022/0148584 A1 May 12, 2022

(30) Foreign Application Priority Data

Nov. 11, 2020 (GB) ...................................... 2017768

(51) Int. Cl.
*G10L 15/187* (2013.01)
*G06F 40/279* (2020.01)
(Continued)

(52) U.S. Cl.
CPC .......... *G10L 15/187* (2013.01); *G06F 40/279* (2020.01); *G10L 15/10* (2013.01); *G11B 27/02* (2013.01)

(58) Field of Classification Search
CPC ....... G10L 15/187; G10L 15/10; G10L 13/08; G10L 13/033; G06F 40/279;
(Continued)

(56) References Cited

U.S. PATENT DOCUMENTS 5,758,323 A * 5/1998 Case ..................... G10L 13/027
379/71
10,455,297 B1 * 10/2019 Mahyar .............. H04N 21/4532
(Continued)

FOREIGN PATENT DOCUMENTS

CN 105788588 A * 7/2016
CN 105788588 B 8/2020

OTHER PUBLICATIONS

Extended European Search Report for corresponding EP Application No. 21204783.1, 27 pages, dated Mar. 11, 2022.
(Continued)

*Primary Examiner* — Paras D Shah
*Assistant Examiner* — Fouzia Hye Solaiman
(74) *Attorney, Agent, or Firm* — Kilpatrick Townsend & Stockton LLP

(57) ABSTRACT

A data processing apparatus includes storage circuitry to store audio data for a plurality of respective dialogue recordings for a content and to store text data indicative of a sequence of respective words within the audio data for each of the plurality of respective dialogue recordings, analysis circuitry to compare the text data for a current dialogue recording with predetermined text data for the content and to output comparison data for the current dialogue recording, the comparison data indicative of one or more differences between the text data for the current dialogue recording and the predetermined text data, selection circuitry to select one or more candidate dialogue recordings from the plurality of respective dialogue recordings for the content in dependence upon the comparison data, and recording circuitry to modify at least a portion of the audio data for the current dialogue recording in dependence upon the audio data for one or more of the candidate dialogue recordings to obtain modified
(Continued)

audio data and to store the modified audio data for the current dialogue recording.

16 Claims, 2 Drawing Sheets

(51) Int. Cl.
*G10L 15/10* (2006.01)
*G11B 27/02* (2006.01)

(58) Field of Classification Search
CPC ..... G06F 16/685; G11B 27/02; G11B 27/031; A63F 13/60; A63F 13/54
USPC ............................................................ 704/9
See application file for complete search history.

(56) References Cited

U.S. PATENT DOCUMENTS

| | | | |
|---|---|---|---|
| 10,878,802 B2* | 12/2020 | Yamamoto | G10L 21/003 |
| 11,836,181 B2* | 12/2023 | Saggi | G06F 16/483 |
| 2006/0095262 A1 | 5/2006 | Danieli | |
| 2008/0154601 A1* | 6/2008 | Stifelman | G10L 15/22 704/251 |
| 2013/0124984 A1* | 5/2013 | Kuspa | H04N 21/435 715/255 |
| 2013/0151251 A1 | 6/2013 | Herz | |
| 2014/0164371 A1* | 6/2014 | Tesch | G06F 16/48 707/731 |
| 2014/0201631 A1* | 7/2014 | Pornprasitsakul | G11B 27/031 715/716 |
| 2018/0233162 A1* | 8/2018 | Venkataramani | G06F 3/165 |
| 2019/0295531 A1* | 9/2019 | Rao | G10L 15/26 |
| 2019/0311745 A1* | 10/2019 | Shenkler | G10L 21/055 |
| 2020/0066293 A1* | 2/2020 | Sanchez | G10L 15/22 |

OTHER PUBLICATIONS

Combined Search Report and Examination Report for corresponding GB Application No. 2017768.9, 7 pages, dated May 11, 2021.

* cited by examiner

APPARATUS AND METHOD FOR ANALYSIS OF AUDIO RECORDINGS

FIELD OF THE DISCLOSURE

The present disclosure relates to apparatus and methods for analysing data associated with an audio recording. In particular, the present disclosure relates to data processing apparatus and methods for analysing one or more dialogue recordings for a content, such as a video game, audio book or movie.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dialogue production for a video game typically requires the work of actors, directors and game developers over months or even years to record thousands, and in some cases hundreds of thousands, of lines of dialogue. For the video game Star Wars: The Old Republic®, more than 200,000 lines of recorded dialogue were performed by hundreds of voice actors making it the largest entertainment voice over project at the time. Fallout 4 ® is another example of a video game having thousands of lines of recorded dialogue. Dialogue production for other types of content such as a movie or an audio book can similarly require the recording of large amounts of dialogue.

The number of various scenarios that can possibly arise within a video game means that video games can often require vast amounts of dialogue and this presents particular challenges during the development of a video game. In particular, for some games the amount of recorded dialogue can be of the order of one hundred times longer in duration than the recorded dialogue used for a feature-length motion picture, and the amount of recorded dialogue can thus result in a time consuming quality assurance process during development of a video game.

One challenge for video games, audio books and movies having audio recorded over a period of time is that a quality of the audio recordings may vary. Audio may be recorded at different locations at different times, such as at different recording studios, which can result in varying quality of the audio recordings. In some cases audio recordings may be recorded that include one or more incorrect words or phrases because one or more words or phrases are not present in the dialogue recording, and/or one or more words or phrases have been mispronounced and/or one or more additional words have been introduced that are not present in the script. User error may sometimes result in actors mispronouncing one or more words, or missing one or more words or introducing one or more additional words during a recording session. In some cases a dialogue recording may be recorded using one version of a script for a content and subsequent changes may be made to the script resulting in differences between the dialogue recording and the script.

It is in the context of the above arrangements that the presently disclosure arises.

SUMMARY

Various aspects and features of the present invention are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
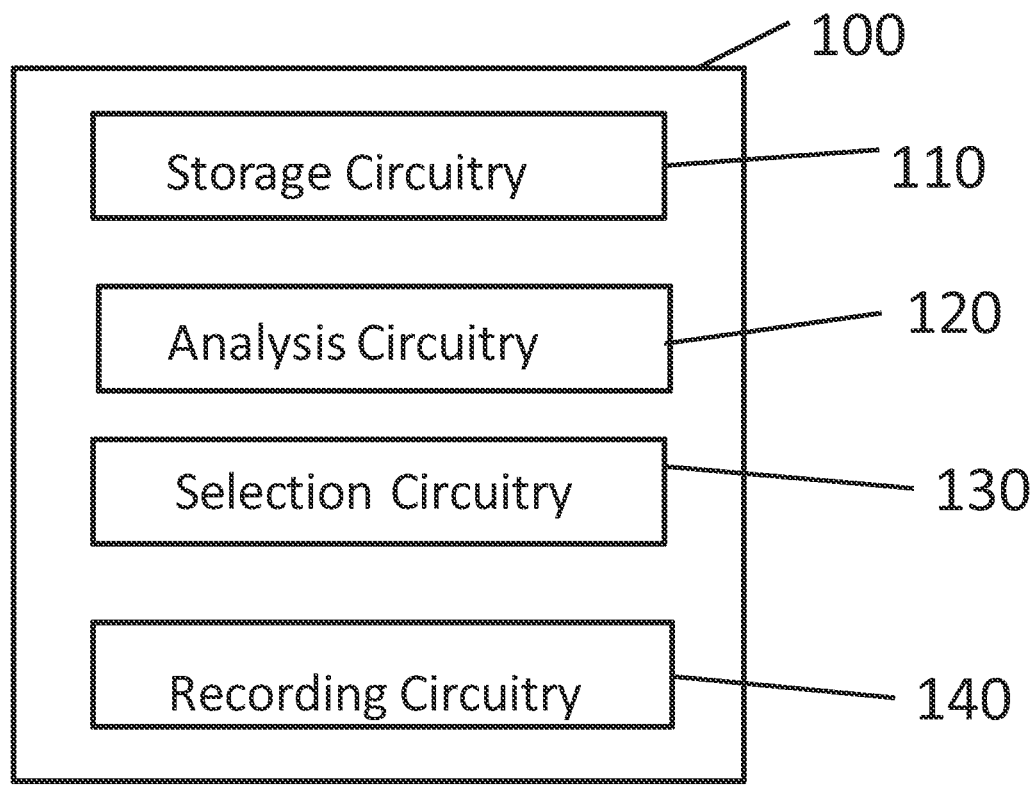
FIG. 1 is a schematic diagram illustrating a data processing apparatus.

Embodiments of the invention will now be described, by way of example only, with reference to the accompanying drawings, in which:

Referring now to the drawings, wherein like reference numerals designate identical or corresponding parts throughout the several views, FIG. 1 schematically illustrates a data processing apparatus 100 for analysing data for at least one dialogue recording and selecting one or more other dialogue recordings for modifying at least a portion of the audio data for the at least one dialogue recording. In embodiments of the disclosure, the data processing apparatus 100 comprises storage circuitry 110 to store audio data for a plurality of respective dialogue recordings for a content and to store text data indicative of a sequence of respective words within the audio data for each of the plurality of respective dialogue recordings, analysis circuitry 120 to compare the text data for a current dialogue recording with predetermined text data for the content and to output comparison data for the current dialogue recording, the comparison data indicative of one or more differences between the text data for the current dialogue recording and the predetermined text data, selection circuitry 130 to select one or more candidate dialogue recordings from the plurality of respective dialogue recordings for the content in dependence upon the comparison data, and recording circuitry 140 to modify at least a portion of the audio data for the current dialogue recording in dependence upon the audio data for one or more of the candidate dialogue recordings to obtained modified audio data and to store the modified audio data for the current dialogue recording.

The storage circuitry 110 can store audio data for a plurality of respective dialogue recordings for a content, such as a video game, a movie or an audio book. More generally, the storage circuitry 110 can store a plurality of respective dialogue recordings for any suitable content that requires respective dialogue recordings. The audio data for each respective dialogue recording includes a sequence of respective words, where a sequence of respective words comprises two or more spoken words. Put differently, a sequence of respective words is included in the audio data for a dialogue recording and the sequence of respective words includes at least a first respective word and a second respective word. As explained below, the plurality of respective dialogue recordings may be a subset of the dialogue recordings that have been recorded for the content. For example, in the case of a video game, the plurality of respective dialogue recordings may be a subset of the dialogue recordings that have been recorded for the video game, such as a plurality of dialogue recordings corresponding to a same in-game level, a same in-game scene, a same in-game character, a same voice actor or a same language, or the plurality of respective dialogue recordings for the video game may in some cases be all of the dialogue recordings available for the video game at the current stage of development of the video game. Similarly, in the case of an audio book, the plurality of respective dialogue recordings may be a subset of the dialogue recordings that have been recorded for the audio book, such as a plurality of dialogue recordings corresponding to a same chapter, a same character or a same voice actor, or the plurality of respective dialogue recordings for the audio book may in some cases be all of the dialogue recordings available for the audio book. In the case of a movie, the plurality of respective dialogue recordings may correspond to a same scene, same character, same voice actor or same language for the movie or the plurality of respective dialogue recordings for the video game may in some cases be all of the dialogue recordings available for the movie. For example, the plurality of dialogue recordings may correspond to a first language for the movie, such that the dialogue recordings to be used for dubbing a movie can be analysed by the data processing apparatus 100.

The storage circuitry 110 is configured to store audio data for a plurality of respective dialogue recordings for a same content (e.g. a same video game or a same audio book). In addition, the storage circuitry 110 is configured to store respective text data for each of the plurality of respective dialogue recordings, where the text data for a dialogue recording is indicative of a sequence of respective words within the audio data for the dialogue recording. The text data is generated for the corresponding audio data using a speech-to-text program. In some cases, the text data is generated for the corresponding audio data by another data processing apparatus executing a speech-to-text program, such as a data processing apparatus used to initially record the dialogue recording. In embodiments of the disclosure, the analysis circuitry 120 is configured to execute a speech-to-text program, such as Dragon® by Nuance for example, to generate text data for at least a portion of the audio data for a dialogue recording. The analysis circuitry 120 can thus be configured to convert at least a portion of the audio data into text data to provide a textual representation of the audio data that includes a sequence of two or more respective words. Therefore, in some examples the data processing apparatus 100 can be configured to receive audio data for a plurality of respective dialogue recordings for a same content, the analysis circuitry 110 can be configured to generate respective text data corresponding to the audio data for each of the respective dialogue recordings, where the text data is indicative of sequence of respective words within the corresponding audio data, and the storage circuitry 110 can be configured to store the audio data for a dialogue recording in association with the text data for the dialogue recording.

The analysis circuitry 120 is configured to compare an instance of text data for a respective dialogue recording with predetermined text data for the content item (also referred to as reference text data for the content). Herein the term "current dialogue recording" is used to refer to a respective dialogue recording of the plurality of respective dialogue recordings stored by the storage circuitry 110 which is analysed by the analysis circuitry 120. The predetermined text data may for example be a predetermined text file (reference text file) including a script of a video game created by a game developer, where the script includes lines of text which are spoken by one or more actors during a recording session. The predetermined text data may include a script for a same in-game level, a same in-game scene, a same in-game character, or a same voice actor for a video game. The predetermined text file may include a plurality of lines of dialogue to be spoken by a given actor, or may include a plurality of lines of dialogue to be spoken by one or more actors. Alternatively, the predetermined text data may be a predetermined text file including one or more chapters of a book, where the book includes lines of text which are to be spoken by one or more actors when recording an audio book. Similarly, the predetermined text data may be a predetermined text file for a movie (or a given scene in a movie) including lines of text to be spoken by one or more actors. Hence more generally, the predetermined text data (reference text data) for the content item includes lines of text representing a correct dialogue for the content.

The analysis circuitry 120 can be configured to select one or more current dialogue recordings from the plurality of respective dialogue recordings stored by the storage circuitry 110 for analysis by the analysis circuitry 120. For example, the analysis circuitry 120 may randomly select one or more dialogue recordings from the plurality of respective dialogue recordings for analysis. Alternatively, the analysis circuitry 120 can be configured to select a dialogue recording from the plurality of respective dialogue recordings in response to a user input. The data processing apparatus 100 may optionally comprise user input circuitry (not shown in FIG. 1) configured to receive a user input indicating a user selection of one or more of the plurality of respective dialogue recordings stored by the storage circuitry 110, and the analysis circuitry 120 can select the one or more respective dialogue for analysis. For example, during quality assurance testing, a developer may realise that a given dialogue recording includes one or more errors. The developer can therefore select the given dialogue recording, the user input circuitry can receive a user input indicating the user selection of the given dialogue recording and the analysis circuitry 120 can select the given dialogue recording as the current dialogue recording for analysis by the data processing apparatus 100. Alternatively, in some cases the storage circuitry 110 is configured to store dialogue recordings for an entire video game, movie or audio book, where each dialogue recording has associated information indicating an in-game level, in-game scene (or movie scene), in-game character (or movie character), voice actor or a chapter in an audio book, for example, and the analysis circuitry 120 can be configured to automatically select dialogue recordings from the plurality of respective dialogue recordings stored by the storage circuitry 110 in dependence upon the associated information to select dialogue recordings for analysis. Therefore, the analysis circuitry 120 may select a subset of the plurality of respective dialogue recording stored by the storage circuitry 110 so as to analyse the subset of dialogue recording. Alternatively, the analysis circuitry 120 can be configured to analyse each of the plurality of respective dialogue recordings stored by the storage circuitry 110 such that the storage circuitry 110 stores dialogue recordings that are each to be analysed by the analysis circuitry 120. For example, the analysis circuitry 120 may analyse each of the plurality of respective dialogue recordings stored by the storage circuitry 110 according to a sequential or a parallel processing technique.

Hence more generally, the data processing apparatus 100 can analyse one or more respective dialogue recordings stored by the storage circuitry 110 to identify whether a respective dialogue recording includes one or more errors compared to the predetermined text data for the content so as to allow identification of one or more errors and modification of the audio data for the respective dialogue recording to correct for one or more of the errors.

In some examples, the predetermined text data for the content may comprise multiple lines of dialogue for a video game, movie or audio book (e.g. a script for an entire video game, movie or audio book) such that the text data for a respective dialogue recording can be compared with the predetermined text data to identify whether the text data matches a portion of the predetermined text data and when the text data does not match with the predetermined text data processing can be performed to modify the audio data for the respective dialogue recording using one or more candidate dialogue recordings.

However, in some cases the predetermined text data may comprise the dialogue for a specific actor/character for a specific scene rather than the dialogue for an entire scene or chapter in a video game or audio book, respectively. For example, the predetermined text data may comprise a single line of dialogue to be spoken by a single actor/character for a given scene. In some situations, a developer may want to identify whether there is a respective dialogue recording stored by the storage circuitry 110 for the predetermined text data. The analysis circuitry 120 can thus be configured to compare the text data for each of the plurality of respective dialogue recordings stored by the storage circuitry 110 with the predetermined text data for the content to identify whether any of the respective dialogue recordings includes a sequence of words that matches the predetermined text data.

In embodiments of the disclosure, the analysis circuitry 120 is configured to compare each of the plurality of respective dialogue recordings for the content with the predetermined text data for the content and to assign a match score to each of the plurality of respective dialogue recordings, wherein the match score for a given dialogue recording is indicative of a degree of match between the sequence of respective words in the text data for a respective dialogue recording and the sequence of respective words in the predetermined text data, and wherein the analysis circuitry 120 is configured to select a dialogue recording having a highest match score as the current dialogue recording. The analysis circuitry 120 can compare first text data for a first dialogue recording with the predetermined text data and assign a match score to the first dialogue recording, and compare second text data for a second dialogue recording with the predetermined text data and assign a match score to the second dialogue recording, and so on for each of the dialogue recordings stored by the storage circuitry 110. In this way, match scores assigned to each of the plurality of respective dialogue recordings can be used to identify a respective dialogue recording having a sequence of respective words that is most similar to the sequence of respective words in the predetermined text data. For example, the match score may take the form of a value ranging from 0 to 1, where a value of 1 indicates that the sequence of respective words in the predetermined text data matches a sequence of respective words in the text data for a dialogue recording.

Therefore, in the case where there is no dialogue recording that exactly matches the predetermined text data, the respective dialogue recording having the highest match score can be selected by the analysis circuitry 120 and used as a starting point (base dialogue recording) so that one or more modifications can be made to the audio data for the respective dialogue recording having the highest match score using one or more candidate dialogue recordings to modify the respective dialogue recording in one or more ways to improve conformity with the predetermined text data. Consequently, the analysis circuitry 120 can advantageously assign match scores to the respective dialogue recordings to identify a respective dialogue recording that requires the fewest number of modifications (least amount of modification) in order to include a sequence of respective words matching the sequence of respective words in the predetermined text data, and the respective dialogue recording that requires the fewest modifications can be selected as the current dialogue recording for modification by the data processing apparatus 100. In this way, when one or more specific lines of dialogue are required by a developer for which there is no matching dialogue recording, the data processing apparatus 100 can identify a dialogue recording on the basis of the match scores to allow a dialogue recording requiring the least amount of processing to be used as the current dialogue recording to be modified for the predetermined text data. By selecting a dialogue recording having a highest match score, a relatively small number of candidate dialogue recordings (in some cases only a single candidate dialogue recording may be required to modify the audio data for the dialogue recording having a highest match score to obtain audio data including a sequence of words matching the predetermined text data) can be used which therefore improves the quality of the resultant audio recording by reducing the number of "audio patches" used to modify the current dialogue recording.

As explained in more detail later, the predetermined text data includes at least one sequence of respective words and the sequence of respective words can be updated in response to a user input. For example, using a text editor a user can freely choose a sequence of respective words using any suitable input device such as a keyboard or a touch screen. Therefore, the user can freely create the predetermined text data to include any phrase and the analysis circuitry 120 can be configured to compare the text data for each of the plurality of respective dialogue recordings with the predetermined text data to identify a respective dialogue recording having the highest match score. In this way, a user (e.g. game developer or audio book developer) can control the predetermined text data that is used by the analysis circuitry 120 to include any sequence of respective words and a given dialogue recording that requires the fewest number of modifications (e.g. requires modification using the fewest candidate dialogue recordings) can be selected by the analysis circuitry 120 as the current dialogue recording for use in creating an instance of audio data including a sequence of respective words that matches the predetermined text data. For example, after a recording session, a developer may subsequently realise that additional lines of dialogue are required, such as additional lines of dialogue for a new scene that was not previously contemplated at the time of the recording session. In this case, the predetermined text data can be set by the developer to include the sequence of respective words that the developer wants to use for the new scene and the analysis circuitry 120 can identify a respective dialogue recording stored by the storage circuitry 110 having the highest match score for the predetermined text data as the current dialogue recording that is to be modified using one or more candidate dialogue recordings to obtain audio data for the dialogue for the new scene.

Figure 2:
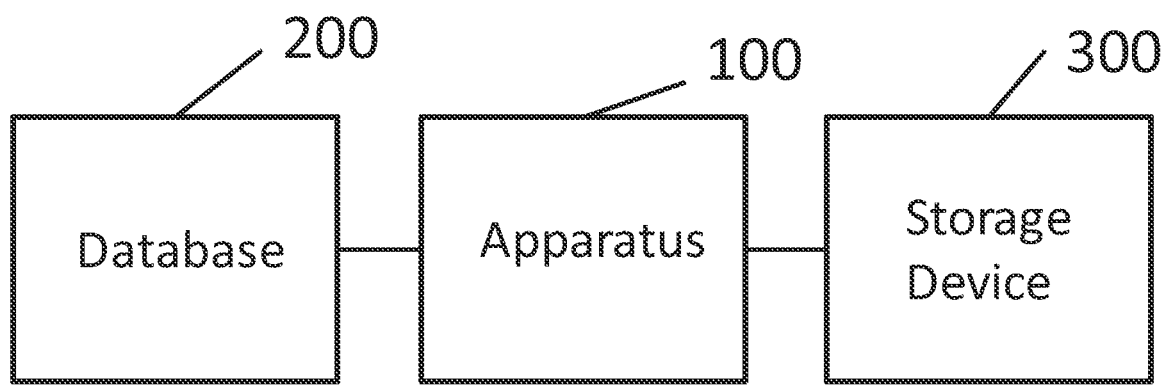
FIG. 2 is a schematic diagram illustrating a system comprising a data processing apparatus and a database for storing audio data for a content.

FIG. 2 schematically illustrates an example of a system comprising the data processing apparatus 100, a database 200 that stores audio data for a plurality of respective dialogue recordings for a same content item, and a storage medium 300 for storing modified audio data generated by the data processing apparatus 100 for one or more dialogue recordings. During development of a video game (or an audio book or a movie), one or more databases 200 can be used to store audio recordings for the video game, including respective dialogue recordings for the video game. The database 200 may in some cases store audio data (and optionally text data generated for the audio data which is indicative of a sequence of respective words within the audio data) for each of the dialogue recordings for the video game. As explained previously, in some cases the text data for a dialogue recording may be generated by a data processing apparatus that initially records the audio data such that the text data for a dialogue recording is stored by the database 200, or in some cases the analysis circuitry 120 can execute a speech-to-text program to generate the text data for a dialogue recording acquired from the database 200 so that the audio data and corresponding text data can be stored by the storage circuitry 110. Hence, in the case where the database 200 does not store text data for a dialogue recording, the text data can be generated by the analysis circuitry 120 upon receiving the audio data for the dialogue recording. The database 200 may store audio data for each of the dialogue recordings for a given portion of the video game, where a given portion may be a portion defined by a predetermined start time and a predetermined end time set by a user (developer). In some cases, the database 200 may store audio data for each of the dialogue recordings for a given portion of the video game, where a given portion may be a given scene or a given in-game level for the video game. The database 200, and also the storage circuitry 110, can be configured to store the audio data for a dialogue recording using any suitable digital audio file format. For example, the audio data for a dialogue recording may be stored using a waveform audio file format standard (WAV), or MPEG-4 or MPEG-3 audio file format.

The data processing apparatus 100 can thus be configured to store the audio data and the text data for a plurality of respective dialogue recordings for a content. As such, the storage circuitry 110 can be provided to store data for a plurality of respective dialogue recordings that are to be analysed by the analysis circuitry 120, so that for a given dialogue recording for which the text data does not match the predetermined text data the audio data for the given dialogue recording can be modified using the audio data stored for one or more of the plurality of dialogue recordings stored by the storage circuitry 110.

The database 200 may be provided as part of a remote server in which case the data processing apparatus 100 can be configured to communicate with the sever via a wireless communication to receive the audio data and the text data. Alternatively, the database 200 may be provided as part of a local storage (e.g. hard-drive) and the data processing apparatus 100 can be configured to communicate with the local storage via a wired or wireless communication (e.g. Wi-Fi® or Bluetooth® wireless link) to receive the audio data and text data. In some examples, the database 200 may be provided as part of the data processing apparatus 100, such that the storage circuitry 110 is configured to access the database 200 to store a subset of the dialogue recordings stored by the database 200 so that the subset can be analysed by the analysis circuitry 120. The data processing apparatus 100 can therefore access the audio data stored by the database 200 for a plurality of dialogue recordings.

The recording circuitry 140 is configured to modify at least a portion of the audio data for the current dialogue recording in dependence upon the audio data for one or more of the candidate dialogue recordings and to store modified audio data for the current dialogue recording. The recording circuitry 140 is provided as part of the data processing apparatus 100 and stores modified audio data for a current dialogue recording. In some examples, the recording circuitry 140 may comprise a first memory region for storing modified audio data for a first portion of a content and a second memory region for storing modified audio data for a second portion of the content. For example, the data processing apparatus 100 may analyse one or more dialogue recordings for a first in-game level, in-game scene, in-game character or a first voice actor and store audio data for one or more modified dialogue recordings in the first memory region, and the data processing apparatus 100 may similarly analyse one or more dialogue recordings for a second in-game level, in-game scene, in-game character or a second voice actor and store audio data for one or more modified dialogue recordings in the second memory region. In some cases, the recording circuitry 140 can be configured to modify the audio data for the current dialogue recording in dependence upon the audio data for one or more of the candidate dialogue recordings and to output the modified audio data for storage by a respective storage device 300 (as shown in FIG. 2).

Referring again to FIG. 1, the analysis circuitry 120 is configured to compare the text data for a given dialogue recording (current dialogue recording) with predetermined text data for the content so as to detect whether the text data for the given dialogue recording matches the predetermined text data. When the analysis circuitry 120 detects that the text data for the given dialogue recording matches the predetermined text data, this indicates that the given dialogue recording is a correct recital of the predetermined text data. In other words, analysis circuitry 120 is configured to compare the sequence of respective words indicated by the text data for the given dialogue recording with the predetermined text data and to detect whether the sequence of respective words is present in the predetermined text data. When detecting that the sequence of respective words is present in the predetermined text data this indicates that the text data (and thus the audio data) matches the predetermined text data. In this case, modification of the audio data for the given dialogue recording is not required. When detecting that the sequence of respective words is not present in the predetermined text data this indicates that the text data (and thus the audio data) does not match the predetermined text data and is thus not a correct recital of the predetermined text data. In this case modification of at least a portion of the audio data for the given dialogue recording is required.

The analysis circuitry 120 is configured to output comparison data for a current dialogue recording in dependence upon the comparison of the text data for the current dialogue recording with the predetermined text data for the content, wherein the comparison data is indicative of one or more differences between the text data for the current dialogue recording and the predetermined text data. When the analysis circuitry 120 detects that the text data for the current dialogue recording does not match the predetermined text data the analysis circuitry 120 is configured to output the comparison data for the current dialogue recording to provide an indication of one or more differences between the sequence of respective words for the text data for the current dialogue recording and a sequence of respective words for the predetermined text data.

In a simplest case, the text data (and the corresponding audio data) for a current dialogue recording may include a sequence of respective words in which one word was erroneously included in the sequence of words by an actor (presence of an additional word in the current dialogue recording) or erroneously omitted from the sequence of words by the actor during recording (absence of a word in the current dialogue recording). For example, during recording an actor may erroneously include the name of one in-game character instead of another in-game character, or an actor may mistakenly not include a particular word in a phrase or may essentially paraphrase the wording in the script. Therefore, a comparison of the sequence of respective words in the text data (speech-to-text data generated for the audio data) for the current dialogue recording with the predetermined text data does not result in an exact match and the analysis circuitry 120 is configured to output the comparison data indicative of one or more differences between the text data for the current dialogue recording and the predetermined text data. The comparison data can indicate at least one respective word that differs between the text data for the current dialogue recording and the predetermined text data. In particular, the comparison data can indicate at least one respective word that is present in the predetermined text data and not present in the text data and/or at least one respective word that is present in the text data and not present in the predetermined text data. In this way, the comparison data indicates one or more words that can be added to and/or removed from the current dialogue recording in order for the current dialogue recording to match the predetermined text data. This is discussed in more detail later.

Similarly, in some cases an actor's pronunciation of a respective word may deviate from an expected normal pronunciation for the respective word. As such, in the case of a mispronunciation of a respective word, the speech-to-text program used to generate the text data for the current dialogue recording will not correctly recognise the respective word and therefore the text data either includes a different word instead of the intended word or does not include any word in-place of the intended word. Therefore, in the case of a mispronunciation of a respective word by an actor during recording, the analysis circuitry 120 can detect a difference between the text data for the current dialogue recording and the predetermined text data based on the comparison of the text data with the predetermined text data and output comparison data indicative of one or more of the differences.

The analysis circuitry 120 therefore outputs comparison data for a current dialogue recording indicating one or more differences between the text data for the current dialogue recording and the predetermined text data and thereby indicating one or more differences between the sequence of respective words in the audio data for the current dialogue recording and the sequence of respective words in the predetermined text data. The selection circuitry 130 is configured to select one or more candidate dialogue recordings from the plurality of respective dialogue recordings stored by the storage circuitry 110 for use in modifying the audio data for the current dialogue recording to correct one or more portions of the audio data, wherein the selection circuitry 130 is configured to select the one or more candidate dialogue recordings responsive to the comparison data output by the analysis circuitry 120 for the current dialogue recording. The one or more candidate dialogue recordings selected by the selection circuitry 130 as possible candidates for use in modifying the audio data for the current dialogue recording each include one or more respective words indicated by the comparison data.

The selection circuitry 130 can therefore select one or more candidate dialogue recordings and the recording circuitry 140 is configured to modify at least one portion of the audio data for the current dialogue recording using the audio data for a candidate dialogue recording so as to modify at least one portion of the sequence of respective words in the audio data. The recording circuitry 140 is configured to modify the audio data for the current dialogue recording by one or more from the list consisting of: adding additional audio data from a candidate dialogue recording; removing a portion of the audio data for the current dialogue recording; and replacing a portion of the audio data for the current dialogue recording with audio data from a candidate dialogue recording. As discussed in more detail later, the recording circuitry 140 modifies one or more portions of the audio data for the current dialogue recording using audio data for one or more candidate dialogue recordings so as to generate modified audio data for the current dialogue recording which includes a sequence of respective words that more closely matches the sequence of respective words indicated by the predetermined text data. As such, the predetermined text data serves are reference data with which the text data can be compared so that audio data corresponding to the text data can be modified in one or more ways that reduces a number of differences between the text data and the predetermined text data.

The recording circuitry 140 is configured to store the modified audio data generated for the current dialogue recording. Therefore, the recording circuitry 140 is configured to store modified audio data for each dialogue recording that is detected by the analysis circuitry 120 as not matching the predetermined text data. In this way, the storage circuitry 110 can store a plurality of respective dialogue recordings for the content and analyse the plurality of respective dialogue recordings, and for each dialogue recording that does not match the predetermined text data the data processing apparatus 100 can generate and store modified audio data.

In embodiments of the disclosure, the predetermined text data for the content includes at least one sequence of respective words, and wherein the sequence of respective words is updateable in response to a user input. The predetermined text data includes a sequence of respective words which can be modified by a user using a text editor to remove one or more respective words, add one or more respective words and/or replace one or more respective words in the sequence of respective words. A sequence of respective words includes one word, followed by at least one other word. The sequence of respective words in the predetermined text data can be freely modified by a user by editing a file (e.g. text file) including the predetermined text data.

The predetermined text data serves as reference data that is compared with the text data for a current dialogue recording. The predetermined text data is compared with the text data for a current dialogue recording to assess whether the dialogue recording correctly recites the sequence of respective words in the predetermined text data. In the case where the sequence of respective words in the text data matches the predetermined text data, the current dialogue recording is determined to be an accurate recitation and the audio data for the dialogue recording does not require modification. However, in the case where the sequence of respective words in the text data does not match the predetermined text data, the current dialogue recording is determined not to be an accurate recitation of the predetermined text data and the recording circuitry 140 performs modification of the audio data for the current dialogue recording using other audio data from one or more candidate dialogue recordings so as to change the audio data in one or more ways to reduce the one or more differences with respect to the predetermined text data.

However, during development of content, such as a video game, a developer may identify one or more errors included in the predetermined text data. Specifically, during development of a video game, a game developer may initially create a video game script including lines of text to be spoken by an actor during a recording session and after the recording of the dialogue recordings the game developer may subsequently realise that there are one or more errors in the initial version of the script. For example, the script may include one or more errors such as missing words and/or additional words and/or incorrect words (e.g. the script may incorrectly refer to a name of a first character when in fact the script should refer to a name of a second character). Therefore, in this case the predetermined text data and the text data for a dialogue recording may both include a same error (because the actor correctly followed the wording of the video game script) and as such the analysis circuitry 120 detects that the text data for a dialogue recording matches the predetermined text data. The predetermined text data can be updated by a user to obtain an updated version of the predetermined text data (updated version of the reference text data) so that the updated version of the predetermined text data can be compared with the text data for a dialogue recording by the analysis circuitry 120. In other words, the user can make one or more changes to the predetermined text data so that a modified version of the predetermined text data can be used for comparison by the analysis circuitry 120. In this way, an error included in the predetermined text data can be corrected by a developer, one or more differences between the updated version of the predetermined text data and the text data for a dialogue recording can be detected, and the comparison data indicative of the one or more differences can be output by the analysis circuitry 120 and used by the selection circuitry 130 to select one or more candidate dialogue recordings for modifying the audio data for the dialogue recording to reduce one or more of the differences with respect to the updated version of the predetermined text data.

The audio data (and thus the text data) for a dialogue recording comprises a first sequence of respective words and the predetermined text data used by the analysis circuitry 120 for comparison comprises a second sequence of respective words. As explained previously, respective text data is generated for the dialogue recording using a speech to text program to generate a textual representation of the audio data for comparison with the predetermined text data. In some examples, the dialogue recording is a dialogue recording obtained specifically for the predetermined text data such that the first sequence of words and the second sequence of respective words should ideally (when the dialogue recording has been recorded correctly) be of the same length (same number of respective words) and match each other exactly. In other examples, the dialogue recording is a dialogue recording for a portion of the predetermined text data, such that the first sequence of words is shorter in length (fewer respective words) and should ideally match a portion of the predetermined text data. This may be the case where the predetermined text data includes a script for an entire content.

For example, the predetermined text data may be a video game script for a whole video game or a whole movie, and the dialogue recording includes words spoken by a given actor for a given in-game scene or a given in-game level and thus contains fewer respective words than the number of respective words in the predetermined text data. Similarly, the predetermined text data may be text data for an entire audio book, and the dialogue recording includes words spoken by a given actor for a given section, subsection or chapter of the audio book and thus includes fewer respective words than the predetermined text data. Therefore, the number of respective words included in the text data for the dialogue recording may be less than the number of respective words included in the predetermined text data.

In some cases, the dialogue recording is a recording obtained specifically for the predetermined text data such that ideally the dialogue recording should include a sequence of respective words that exactly matches a sequence of respective words in the predetermined text data and the total number of words in the sequence of respective words should be the same in the dialogue recording and the predetermined text data. For example, in the case of an audio book, the dialogue recording may correspond to a given section, subsection or paragraph in the audio book (such that the first word of the dialogue recording is the first word for the section/subsection/paragraph and the last word of the dialogue recording is the last word for the section/subsection/paragraph) and the predetermined text data may also correspond to the same given section, subsection or paragraph. Similarly, in the case of a video game, the dialogue recording may correspond to a given in-game character's voice recording for a given in-game scene or in-game level and the predetermined text data may also correspond to the given in-game character's voice recording for the given in-game scene or in-game level. Therefore, the number of respective words included in the text data for the dialogue recording may be expected to be substantially the same as the number of respective words included in the predetermined text data. However, one or more errors during the recording of the dialogue recording may cause the number of respective words for the text data for the dialogue recording to be greater than the number of respective words included in the predetermined text data.

In embodiments of the disclosure, the analysis circuitry 120 is configured to detect a sequence of respective words in the predetermined text data having a highest degree of match with the text data for the current dialogue recording in dependence upon the comparison of the text data for the current dialogue recording with the predetermined text data. The analysis circuitry 120 compares the text data for a current dialogue recording with the predetermined text data to detect a sequence of respective words (a group of successive words) in the predetermined text data that is most similar to the text data for the current dialogue recording. For example, the text data for a current dialogue recording may be indicative of a sequence of respective words such as "hello there agent five can I help you with anything" and the predetermined text data may include multiple lines of text. The analysis circuitry 120 can be configured to compare the text data with the predetermined text data to detect a portion of the predetermined text data including a sequence of words that most closely matches the sequence of words in the text data. For example, the analysis circuitry 120 may firstly perform a search for the words "hello there agent five can I help you with anything" to detect whether an instance of those words in that order is included in the predetermined text data. In response to detecting that the predetermined text data includes a group of words matching the text data (detecting that the sequence of respective words indicated by the text data is present in the predetermined text data), the analysis circuitry 120 determines that the current dialogue recording is a correct recital of the predetermined text data and modification of the audio data for the dialogue recording is not required. However, in response to detecting that the text data does not have a matching portion in the predetermined text data, the analysis circuitry 120 can perform further processing to detect a portion of the predetermined text data having a highest degree of match, where a portion of the predetermined text data having a highest degree of match is a portion having a greatest number of matching words with the text data. There are a number of ways in which the analysis circuitry can be configured to detect a sequence of respective words in the predetermined text data having a highest degree of match with the text data.

For example, the analysis circuitry 120 can be configured to perform a search for each of the respective words indicated by the text data to identify a portion (a sequence of respective words) of the predetermined text data including a greatest number of matching words. In this example, the analysis circuitry 120 can search for the words "hello", "there", "agent", "five", "can", "I", "help", "you", "with" and "anything" to identify where these words a present in the predetermined text data and detect one or more portions including at least some of these words. The analysis circuitry 120 can therefore detect the instances of the respective words in the predetermined text data and detect one or more portions of the predetermined text data including one or more matching words, where each detected portion comprises at least one matching word and each detected portion begins and ends with a matching word. Each detected portion can also comprise one or more non-matching words between two matching words depending on a threshold condition for portion detection used by the analysis circuitry 120. The analysis circuitry 120 can thus be configured to detect one or more portions of the predetermined text data and select a portion of the predetermined text data including a greatest number of matching words with the text data. The analysis circuitry 120 can be configured to detect one or more portions using a threshold condition for portion detection as described above. The threshold condition for portion detection may be set so that a maximum of N non-matching words is allowed between two matching words, where N can be set to any integer that is greater than or equal to 1. Therefore, in the case where the predetermined text data includes the words "hello there Mister Jones can I help you" and the value of N is set to two, the analysis circuitry 120 can be configured to detect one portion that includes the words "hello there Mister Jones can I help you", in which the words "Mister Jones" do not match with any of the respective words in the text data. It will be appreciated that the value of N can be freely set to any integer value greater than or equal to 1. Typically for the case where the wording for a dialogue recording differs from the predetermined text due to the omission, inclusion or replacement of a relatively small number of words (e.g. 1, 2 or 3 words) due to user error during a recording session, a value of N=1, 2 or 3 can be suitable to allow detection of the portion of the predetermined text data for which the text data is actually intended to match.

Hence more generally, the analysis circuitry 120 can search the predetermined text data for one or more blocks of text, where each block of text begins and ends with a word that matches a word in the text data, and between the beginning word and end word of the block there can be no more than N consecutive non-matching words. Consequently, in the case where the text data erroneously includes an additional word that is not included in the predetermined text data, the portion of the predetermined text data for which the recording was initially made can be reliably detected as a block in which a non-matching word (or N consecutive non-matching words) is bounded on either side by a matching word. Similarly, in the case where the text data erroneously does not include a word, the portion of the predetermined text data for which the recording was initially made will be identified as a block in which each word matches the text data.

Once the analysis circuitry 120 has detected the one or more portions in the predetermined text data that include one or more words matching the text data, the analysis circuitry 120 can be further configured to rank each of the detected portions according to a number of matching words in each detected portion and select the highest ranked detected portion. Continuing with the above example in which the text data includes the words "hello there agent five can I help you with anything", the analysis circuitry 120 may detect a first portion of the predetermined text data including the words "can I help you with anything" and a second portion of the predetermined text data including the words "hello there agent seven can I help you with anything", and in this case the second portion is ranked higher than the first portion because the second portion includes nine of the ten words included in the text data whereas the first portion includes only six of the ten words included in the text data. Continuing with the above example, the analysis circuitry 120 may detect a third portion of the predetermined text data including the words "can I help you with anything today agent five" in which case the third portion includes eight of the ten words included in the text data and is therefore ranked higher than the first portion but lower than the second portion. The second and third portions described above provide examples of detected portions of the predetermined text data that include at least one word that is not present in the text data. In this case, the analysis circuitry 120 compares the text data with the predetermined text data and detects the second portion (also referred to as the second sequence of respective words) as having the highest degree of match with the text data in dependence upon the number of matching words. The analysis circuitry 120 is thus configured to compare the text data with the portion having the highest degree of match and output the comparison data for the dialogue recording indicative of one or more differences between the text data and the portion having the highest degree of match. Whilst the above description provides an example of a situation in which an incorrect word has been included in a dialogue recording (e.g. by referring to agent seven when in fact agent five should have been referred to), in some examples the text data for a dialogue recording may differ from the predetermined text data because the text data includes an extra word in the sequence of words and/or because the text data is missing a word in the sequence of words. The analysis circuitry 120 can thus detect a portion of the predetermined text data having the highest degree of match using the techniques describe above and output comparison data indicative of one or more differences between the portion of the predetermined text data having the highest degree of match and the text data. In this example, the comparison data indicates that the word "five" is to be removed from the dialogue recording and that the word "seven" is to be added to the dialogue recording.

In another example, the analysis circuitry 120 can be configured to detect a sequence of respective words in the predetermined text data having a highest degree of match with the text data for a current dialogue recording by performing a search for a respective word indicated by the text data to detect one or more portions in the predetermined text data and progressively narrowing the search by including another word indicated by the text data in the search until a single matching portion is detected. The analysis circuitry 120 can thus use the respective words indicated by the text data to perform a search within the predetermined text data that progressively narrows until only one matching portion remains and the last remaining matching portion is selected as the portion having the highest degree of match with the text data. For example, the analysis circuitry 120 may initially search for the word "hello" in the predetermined text data to detect each instance of the word in the predetermined text data. The analysis circuitry 120 may then search for the words "hello there" in that order in the predetermined text data to detect each instance of the words "hello there" in the predetermined text data. In the event that there are multiple instances of the words "hello there", the analysis circuitry 120 can further search for the words "hello there agent". The analysis circuitry 120 continues to introduce another word into the search until just one detected portion remains. Whilst the above example has been described as starting with the first word in the sequence of words indicated by the text data and progressing through the words sequentially, the analysis circuitry 120 can select any of the words in the sequence of words indicated by the text data to begin the search with (e.g. the search may be performed starting with the word "anything" and progressively work backwards so that the second search is performed using the words "with anything" in that order). Therefore, preferably the analysis circuitry 120 performs a first search starting with the first word in the sequence of words indicated by the text data and progressively narrows the search and also performs a second search starting with the last word in the sequence of words indicated by the text data and progressively narrows by adding a previous word in the sequence. Therefore, by performing two progressively narrowing searches starting from a first word (or a second word, or a third word) and a last word (or a penultimate word) two portions of the predetermined text data can be detected which are proximate to each other (e.g. possibly separated by a single non-matching word or two non-matching words) and the analysis circuitry 120 can be configured to detect the two portions of the predetermined text data as a single portion depending on a threshold condition, such as whether the two portions of the predetermined text data are separated by M or fewer non-matching words (where M is an integer greater than or equal to 1 that can be freely set).

The comparison data for the current dialogue recording indicates at least one of: a respective word that is present in the predetermined text data and not present in the text data for the current dialogue recording; and a respective word that is present in the text data for the current dialogue recording and not present in the predetermined text data. In the case where the text data for the current dialogue recording includes an additional word that is not present in the portion of the predetermined text data detected to have the highest degree of match, the comparison data is indicative of the respective word that is present in the text data for the current dialogue recording and not present in the detected portion. In this way, the comparison data can indicate one or more respective words that are to be removed from the current dialogue recording. Conversely, in the case where the portion of the predetermined text data detected to have the highest degree of match includes an additional word that is not present in the text data for the current dialogue recording, the comparison data is indicative of the respective word that is present in the predetermined text data and not present in the text data for the current dialogue recording. In this way, the comparison data can indicate one or more respective words that are to be inserted into the current dialogue recording Hence, the comparison data is output by the analysis circuitry 120 to provide an indication of one or more respective words that should be added to and/or removed from the audio data for the current dialogue recording.

In embodiments of the disclosure, the comparison data is indicative of one or more of the respective words present in the sequence of respective words in the predetermined text data having the highest degree of match that are not present in the sequence of respective words in the text data for the current dialogue recording. Put differently, the comparison data is indicative of one or more of the respective words in the sequence of respective words (portion of the predetermined text data) having the highest degree of match that do not match a respective word in the sequence of respective words in the generated text data. In the case where the audio data and the text data for a dialogue recording are missing one or more respective words in comparison to the predetermined text data, the comparison of the text data with the predetermined text data will indicate that the sequence of words in the text data for the current dialogue recording differs from the sequence of words having the highest degree of match in the predetermined text data due to one or more respective words not being present in the text data. The analysis circuitry 120 can thus output the comparison data for the dialogue recording indicating that a respective word is missing from the dialogue recording. In this way, the comparison data for the dialogue recording indicates one or more respective words that are required to be added to the audio data for the current dialogue recording so that the current dialogue recording can be modified to more closely match the predetermined text data.

The predetermined text data may included multiple lines of text (in some cases, possibly all the lines of dialogue for level or scene in a video game). The analysis circuitry 120 can detect a portion of the predetermined text data having a highest degree of match with the text data for the current dialogue recording as explained previously, and using the detected portion of the predetermined text data the comparison data can be output to indicate one or more respective words that differ between the detected portion of the predetermined text data and the text data for the current dialogue recording. In the case where the current dialogue recording is missing one or more respective words compared to the detected portion of the predetermined text data, the comparison data output by the analysis circuitry 120 for the current dialogue recording is indicative of the one or more words that are present in the detected portion of the predetermined text data and not present in the sequence of respective words in the text data for the current dialogue recording. Alternatively or in addition, in the case where the current dialogue recording includes one or more additional respective words compared to the detected portion of the predetermined text data, the comparison data output by the analysis circuitry 120 for the current dialogue recording is indicative of the one or more words that are present in the sequence of respective words in the text data for the current dialogue recording and not present in the detected portion of the predetermined text data.

For example, the text data for the current dialogue recording may include the respective words "A, C, G, H, J", where A, C, G, H and J are used here as labels for respective words. The analysis circuitry 120 can compare the sequence of respective words in the text data for the current with the predetermined text data and may detect a sequence of words "A, C, F, G, H, J", as having the highest degree of match. Therefore, the analysis circuitry 120 detects that the sequence of words "A, C, G, H, J" and the sequence of words "A, C, F, G, H, J" were intended to match each other and the error is the omission of the word "F" from the current dialogue recording. In this example, the analysis circuitry 120 outputs comparison data indicative of the respective word "F" as being missing from the current dialogue recording.

In embodiments of the disclosure, the comparison data is indicative of one or more respective words that are not present in the sequence of respective words in the text data for the current dialogue recording and the selection circuitry 130 is configured to select a candidate dialogue recording from the plurality of respective dialogue recordings in dependence upon whether the text data for the candidate dialogue recording is indicative of one or more respective words that match one or more of the respective words indicated by the comparison data. The selection circuitry 130 is configured to select one or more dialogue recordings from the plurality of respective dialogue recordings stored by the storage circuitry 110 for the content to obtain one or more candidate dialogue recordings, in which each candidate dialogue recording includes one or more of the respective words indicated by the comparison data. Therefore, a portion of the audio data for a candidate dialogue recording corresponding to the respective word that is missing from the current dialogue recording can be used by the recording circuitry 140 to modify the audio data for the current dialogue recording so as to modify the audio data for the current dialogue recording to incorporate the missing word into the audio data.

In particular, when the comparison data indicates that a word such as "battle", for example, is missing from the text data for a current dialogue recording, the selection circuitry 130 can select one or more candidate dialogue recordings each including at least one instance of the word "battle". Then, using at least one of the candidate dialogue recordings, the recording circuitry 140 can modify the audio data for the current dialogue recording to include the portion of the audio data from a candidate dialogue recording including the word "battle" so that the word "battle" is incorporated into the audio data for the current dialogue recording to generate modified audio data for the dialogue recording. In this way, the modified audio data for the dialogue recording is generated such that the sequence of respective words in the modified audio data more closely matches the sequence of respective words in the predetermined text data. Therefore, in this case the modified audio data for the current dialogue recording differs from the original audio data for the current dialogue recording in that the modified audio data includes at least one respective word that is not present in the original audio data.

In a simplest case in which a single word is to be added to the audio data for a current dialogue recording, the selection circuitry 130 can be configured to randomly select, in response to the selection circuitry 130 selecting a plurality of candidate dialogue recordings each including at least one instance of the word, one of the plurality of candidate dialogue recordings for use in modifying the audio data for the current dialogue recording. As discussed in more detail later, of the candidate dialogue recordings selected by the selection circuitry 130 there may be one or more candidate dialogue recordings that are better suited to the current dialogue recording than the other candidate dialogue recordings. The selection circuitry 130 can optionally be configured to assign one or more priority ratings to one or more of the candidate dialogue recordings according to one or more properties associated with each of the one or more candidate dialogue recordings to allow the one or more candidate dialogue recordings to be ranked so that one of the candidate dialogue recordings can be preferentially selected. In this way, a candidate dialogue recording having one or more properties that are similar to one or more properties of the currently analysed dialogue recording can be selected for use in modifying the audio data of the current dialogue recording analysed by the analysis circuitry 120.

In embodiments of the disclosure, the plurality of respective dialogue recordings stored by the storage circuitry 110 each correspond to a same voice actor. The plurality of respective dialogue recordings may each have been recorded using the same voice actor, and as such when one or more words are missing from a current dialogue recording analysed by the analysis circuitry 120, the selection circuitry 130 can select one or more candidate dialogue recordings each including at least one instance of at least one missing word for use by the recording circuitry 140 to modify the audio data for the current dialogue recording. However, in some cases the plurality of respective dialogue recordings stored by the storage circuitry 110 may include dialogue recordings for a plurality of different actors. In this case, the recording circuitry 140 can in some cases be configured to execute a pitch-adjustment program for a candidate dialogue recording so as to modify a pitch of the voice for the candidate dialogue recording to be substantially the same as or at least similar to a pitch of the voice for the current dialogue recording. Alternatively or in addition, the selection circuitry 130 can be configured to firstly select the candidate dialogue recordings from the plurality of dialogue recordings stored by the storage circuitry 110 (where each candidate dialogue recording includes at least one word indicated by the comparison data as missing from the text data for the current dialogue recording) and assign one or more priority ratings to each candidate dialogue recording, where one of the priority ratings may be assigned in dependence upon comparison of the pitch of the voice for the candidate dialogue recording with the pitch of the voice for the current dialogue recording. This is discussed in more detail below in relation to the sixth priority rating.

In embodiments of the disclosure, the selection circuitry 130 is configured to assign one or more priority ratings to a candidate dialogue recording in dependence upon one or more properties associated with at least one of the audio data and the text data for the candidate dialogue recording. The selection circuitry 130 can be configured to assign a first priority rating to a candidate dialogue recording in dependence upon a comparison of a value of a first property of the dialogue recording with a value of the first property of the candidate dialogue recording. Similarly, the selection circuitry 130 can be configured to assign a second priority rating to a candidate dialogue recording in dependence upon a comparison of a value of a second property of the dialogue recording with a value of the second property of the candidate dialogue recording, where the first property is different from the second property. Hence more generally, the selection circuitry 130 can assign a priority rating to at least some of the candidate dialogue recordings in dependence upon a magnitude of a difference between a value of a given property of the dialogue recording and a value of the given property of the current dialogue recording. As such, a priority rating indicative of a higher level of priority is assigned to a candidate dialogue recording having a higher level of similarity between the current dialogue recording and the candidate dialogue recording for the same given property, whereas a priority rating indicative of a lower level of priority is assigned to a candidate dialogue recording having a lower level of similarity between the current dialogue recording and the candidate dialogue recording for the same given property. A priority rating may for example comprise a number (e.g. a number from 0 to 1, or 0 to 100) indicating a level of priority for a candidate dialogue recording. In some cases, the priority rating may take the form of a binary indicator indicating high priority or low priority. Alternatively, the priority rating may comprise data indicative of a classification from a plurality of classifications (e.g. high priority, intermediate priority, low priority). This is discussed in more detail later. A number of different properties associated with the audio data and/or text data for the dialogue recordings can be used to assign a priority rating and the various properties are discussed in more detail below.

In embodiments of the disclosure, the selection circuitry 130 is configured to assign a first priority rating to a candidate dialogue recording in dependence upon a number of respective words indicated by the comparison data that are present in the text data for the candidate dialogue recording. As explained previously, the comparison data is indicative of one or more differences between the text data for the current dialogue recording and the predetermined text data, and as such can be indicative of one or more words that are missing from the text data for the current dialogue recording and present in the predetermined text data in the case where the current dialogue recording erroneously does not include one or more words. The comparison data can thus be indicative of a plurality of respective words that are missing from the text data for the current dialogue recording in comparison to the predetermined text data. The selection circuitry 130 is configured to select one or more candidate dialogue recordings in dependence upon the comparison data so that each candidate dialogue recording includes at least one word indicated by the comparison data. However, in some cases some candidate dialogue recordings may only include one of the plurality of respective words indicated by the comparison data, whereas other candidate dialogue recordings may include more than one of the plurality of respective words indicated by the comparison data. The selection circuitry 130 can be configured to assign a first priority rating to a candidate dialogue recording according to how many respective words indicated by the comparison data are included in the text data (and thus the audio data) for the candidate dialogue recording so as to assist in identifying a preferred candidate dialogue recording from a plurality of candidate dialogue recordings. For example, for comparison data indicating the words "battle" and "time" as missing from the current dialogue recording, the selection circuitry 130 can detect whether at least one instance of the word "battle" is present in the text data for a candidate dialogue recording and detect whether at least one instance of the word "time" is present in the text data for the candidate dialogue recording and assign the first priority rating to the candidate dialogue recording indicative of how many of the respective words indicated by the comparison data are present in the candidate dialogue recording. As such, a first candidate dialogue recording include at least one instance of the word "battle" and at least one instance of the word "time" has a first priority rating indicative of a higher level of priority and a second candidate dialogue recording including at least one instance of the word "battle" and no instances of the word "time" has a first priority rating indicative of a lower level of priority.

It will be appreciated that the comparison data can indicate N respective words that are missing from the text data for the current dialogue recording (where N is an integer greater than or equal to 1). The first priority rating may for example be a number ranging from 0 to 1, where a value of 1 indicates that each of the respective words indicated by the comparison data are present in the candidate dialogue recording and a value of 0 indicates that just one of the respective words indicated by the comparison data is present in the candidate dialogue recording. The selection circuitry 130 can be configured to assign a first priority rating to each of a plurality of candidate dialogue recordings to allow the plurality of candidate dialogue recordings to be ranked in dependence upon the first priority rating. The first priority rating therefore assists in identifying which of the respective candidate dialogue recordings include a large number of the respective words indicated by the comparison data and are thus more preferable for using when modifying the audio data for the current dialogue recording because fewer candidate dialogue recordings can be used overall to achieve the modification of the current dialogue recording to match the sequence of respective words in the predetermined text data. In a simplest case, the first priority rating may indicate that a given candidate dialogue recording includes at least one instance of each of the plurality of respective words indicated by the comparison data, in which case it is possible to modify the audio data for the current dialogue recording using just the audio data for the given candidate dialogue recording without requiring the use of other candidate dialogue recordings. Therefore, the first priority rating can assist in identifying one or more candidate dialogue recordings that can be used to modify the current dialogue recording using a smallest number of respective candidate dialogue recordings to thereby allow for a reduction in the amount of processing for modifying the audio data for the current dialogue recording.

In embodiments of the disclosure, the selection circuitry 130 is configured to assign a second priority rating to a candidate dialogue recording in dependence upon a number of respective words included in the text data for the candidate dialogue that match a respective word included in the text data for the current dialogue recording. The selection circuitry 130 can be configured to assign a second priority rating to a candidate dialogue recording according to how many respective words included in the text data for the candidate dialogue recording match a respective word included in the text data for the current dialogue recording, such that the second priority rating indicates a higher level of priority for a candidate dialogue recording having a greater number of matching words with the text data for a current dialogue recording. As such, the selection circuitry 130 can compare the text data for each of a plurality of candidate dialogue recordings with the text data for a current dialogue recording and assign a second priority rating to each of the plurality of candidate dialogue recordings depending on a number of matching respective words for each of the plurality of candidate dialogue recordings. The selection circuitry 130 can be configured to assign a second priority rating to each of a plurality of candidate dialogue recordings to allow the plurality of candidate dialogue recordings to be ranked in dependence upon the second priority rating. Consequently, a candidate dialogue recording including a relatively large number of respective words in common with the current dialogue recording can be indicated with a higher priority by the second priority rating and there is a greater likelihood that the candidate dialogue recording and the current dialogue recording relate to a similar type of scenario in a content (e.g. similar in-game scene or similar in-game level) such that the candidate dialogue recording is more likely to be suited to being used for modifying the current dialogue recording. By evaluating an overall similarity of the wording in the candidate dialogue recording with respect to the current dialogue recording, it is likely that a candidate dialogue recording having a similar context to the current dialogue recording can be identified and that the actors voice in the candidate dialogue recording will therefore have one or more properties such as speech rate, loudness and/or intonation that are well suited to the current dialogue recording. For example, when the current dialogue recording includes words such as "run", "fire" and "jump" which may be typical of an in-game battle scene, one or more candidate dialogue recordings including these words can be distinguished using the second priority rating, and as such there is improved likelihood that the candidate dialogue recording and the current dialogue recording both relate to an in-game battle scene in which the voices will be relatively loud and will have a relatively fast speech rate.

For example, for a current dialogue recording for which the text data includes the words "hello there agent five can I help you with anything", the selection circuitry 130 can be configured to perform a search of the text data for a candidate dialogue recording to search for each of the respective words included in the current dialogue recording to detect a number of respective words included in the candidate dialogue recording that each match a respective word in the text data for the current dialogue recording. For a first candidate dialogue recording including a total number of X respective words that each match a respective word in the current dialogue recording, the selection circuitry 130 can be configured to assign a second priority rating indicating a first level of priority. For a second candidate dialogue recording including a total number of Y respective words that each match a respective word in the current dialogue recording, the selection circuitry 130 can be configured to assign a second priority rating indicating a second level of priority, wherein the first level of priority is of higher priority than the second level of priority when X is greater than Y.

In embodiments of the disclosure, the selection circuitry 130 is configured to: detect, in a sequence of words included in the predetermined text data, a respective word that is adjacent to a respective word indicated by the comparison data; detect, in a sequence of words included in the text data for the candidate dialogue recording, a respective word that is adjacent to a respective word indicated by the comparison data; and assign a third priority rating to the candidate dialogue recording in dependence upon whether the detected respective words match each other. As explained previously, the comparison data output for a given dialogue recording can indicate one or more respective words that are present in the predetermined text data and missing from the dialogue recording. The selection circuitry 130 can be configured to detect, in the sequence of words for the predetermined text data, a respective word that is adjacent to a respective word that is indicated by the comparison data, where an adjacent word is adjacent and prior to the respective word indicated by the comparison data and/or an adjacent word is adjacent and subsequent to the respective word indicated by the comparison data. Similarly, the selection circuitry 130 can be configured to detect, in the sequence of words for the text data of the candidate dialogue recording, a respective word that is adjacent to a respective word indicated by the comparison data, where an adjacent word is prior to the respective word indicated by the comparison data and/or an adjacent word is subsequent to the respective word indicated by the comparison data. The selection circuitry 130 can thus compare an adjacent word detected in the predetermined text data with an adjacent word detected in the candidate dialogue recording and assign the third priority rating to the candidate dialogue recording when the adjacent words match each other. In particular, the pronunciation of a given word in a sequence of words can often be affected by a word that comes immediately before and/or immediately after the word. Therefore, the selection circuitry 130 can assign the third priority rating for use in identifying a candidate dialogue recording that includes two sequential words that match two sequential words in the predetermined text data, where one of the two sequential words in the predetermined text data matches a word indicated by the comparison data.

In particular, a given word may be pronounced differently and therefore sound quite different when said as part of a sentence compared to when said in isolation. One or more properties associated with a first word that immediately precede a second word can greatly affect the way in which a person pronounces the second word, by affecting a softness and/or harshness of certain phonemes, a duration of the word and/or an intonation for the word. For example, when pronounced together the words "of course" can often sound different from pronouncing the words "of" and "course" separately and then juxtaposing the two words. As such, the selection circuitry 130 can assign the third priority rating to indicate that a group of two words in the predetermined text data is also present in a candidate dialogue recording thereby indicating one or more candidate dialogue recordings that are more preferable for use in modifying the audio data for the current dialogue recording. Preferably, the selection circuitry 130 is configured to: detect, in the sequence of words for the predetermined text data, a respective word that is adjacent and prior to a respective word indicated by the comparison data; and detect, in the sequence of words for the text data for the candidate dialogue recording, a respective word that is adjacent and prior to a respective word indicated by the comparison data. This is because a word that is immediately prior to a given word generally has a greater effect on the pronunciation of the given word than a word that is immediately subsequent to the given word.

The third priority rating is assigned according to whether the adjacent words match each other such that the third priority rating is not assigned when the adjacent words do not match each other. As such, the third priority rating may take the form of a fixed number (e.g. 1) or flag data such that the presence of the flag indicates that the third priority rating has been assigned to the candidate dialogue recording. As explained in more detail later, in some examples the priority ratings assigned to a given candidate dialogue recording may each indicate a value such that the values associated with the respective priority ratings for a candidate dialogue recording can be used to calculate a confidence score for the candidate dialogue recording. In this case, the third priority rating has a given value (e.g. 1) such that the third priority rating can be used to calculate the confidence score when assigned to a candidate dialogue recording.

In embodiments of the disclosure, the selection circuitry 130 is configured to calculate a number of words per unit time for both the candidate dialogue recording and the current dialogue recording and to assign a fourth priority rating to the candidate dialogue recording in dependence upon a magnitude of a difference between the number of words per unit time for the candidate dialogue recording and the current dialogue recording. The selection circuitry 130 can detect a total duration of the audio data for a candidate dialogue recording and a total duration of the audio data for a current dialogue recording. In addition, the selection circuitry 130 can detect a total number of respective words included in the text data for the candidate dialogue recording and a total number of respective words included in the text data for the current dialogue recording. Therefore, the selection circuitry 130 can calculate a number of words per unit time for the candidate dialogue recording and also calculate a number of words per unit time for the current dialogue recording and assign the fourth priority rating to the candidate dialogue recording according to a difference between the two calculated word rates. The fourth priority rating may take the form of a value ranging from 0 to 1, for example, where a value of 1 indicates that the two calculated words rates are the same and the value decreases in magnitude with increasing difference between the two calculated word rates. Therefore, the selection circuitry 130 can assign the fourth priority rating to one or more candidate dialogue recording according to a similarity of a word rate for the candidate dialogue recording with the current dialogue recording, where a higher similarity in word rate corresponds to a fourth priority rating indicative of a higher level of priority. The fourth priority rating can thus be used to identify one or more candidate dialogue recording for which an actor's voice has a similar speech rate so that a candidate dialogue recording in which the respective words are similar in duration to the duration of the respective words in the current dialogue recording can be selected for use in modifying the audio data for the current dialogue recording. It will be appreciated that rather than detecting a total duration and a total number of respective words for a recording, the selection circuitry 130 can instead calculate a word rate by analysing a number of respective words for a portion of the audio data so as to estimate the word rate on the basis of a portion of the dialogue recording.

In embodiments of the disclosure, the selection circuitry 130 is configured to detect, for both the candidate dialogue recording and the current dialogue recording, an amplitude for an audio signal associated with the audio data and to assign a fifth priority rating to the candidate dialogue recording in dependence upon a magnitude of a difference between the detected amplitudes. The plurality of respective dialogue recordings stored by the storage circuitry 110 each include a plurality of words spoken by an actor and a volume (decibel rating) may vary from one dialogue recording to another. For example, a dialogue recording corresponding to an in-game battle scene will typically have a louder voice recording than a dialogue recording corresponding to an in-game scene in which characters discuss tactics. The selection circuitry 130 can thus assign the fifth priority rating to one or more candidate dialogue recordings so that a higher priority level is indicated by the fifth priority rating for a candidate dialogue recording having audio data with a similar loudness to the audio data for the current dialogue recording. For example, the fifth priority rating may take the form of a value ranging from 0 to 1, for example, where a value of 1 indicates that the two calculated words rates are the same and the value decreases in magnitude with increasing difference between the two calculated word rates.

In embodiments of the disclosure, selection circuitry 130 is configured to detect, for both the candidate dialogue recording and the current dialogue recording, a pitch for an audio signal associated with the audio data and to assign a sixth priority rating to the candidate dialogue recording in dependence upon a magnitude of a difference between the detected pitches. The selection circuitry 130 can be configured to execute a pitch detection program to detect a pitch associated with the voice in the current dialogue recording and to detect a pitch associated with the voice in a candidate dialogue recording. An average (any of mean, mode or median) pitch for a portion of a candidate dialogue recording can be detected and compared with an average pitch for a portion of the current dialogue recording. The selection circuitry 130 can therefore assign the sixth priority rating to a candidate dialogue recording so that a higher priority level is indicated by the sixth priority rating for a candidate dialogue recording for which the pitch of the voice is similar to the pitch of the voice in the current dialogue recording. In this way, when the storage circuitry 110 stores respective dialogue recordings obtained for a plurality of different actors, the sixth priority rating can be used to indicate one or more candidate dialogue recordings for which a voice pitch is similar to the voice pitch for the current dialogue recording as having a higher priority level. As explained previously, any of the candidate dialogue recording selected by the selection circuitry 130 can optionally be modified using a pitch-adjustment program to adjust a pitch to be more similar to current dialogue recording.

In embodiments of the disclosure, the selection circuitry 130 is configured to rank at least some of the candidate dialogue recordings in dependence upon one or more of the priority ratings. The selection circuitry 130 can be configured to assign any of the first, second, third fourth, fifth and sixth priority ratings to any of the candidate dialogue recordings selected by the selection circuitry 130. Any combination of the first, second, third, fourth, fifth and sixth priority ratings can be assigned to a given candidate dialogue recording. The selection circuitry 130 can rank each candidate dialogue recording that has been assigned at least one priority rating with respect to another candidate dialogue recording that has been assigned at least one priority rating. For example, the selection circuitry 130 may assign the first priority rating to each of the respective candidate dialogue recordings and order the candidate dialogue recordings with respect to each other on the basis of the first priority ratings. In this case, the comparison of the first priority rating assigned to each candidate dialogue recording can be used to order the candidate dialogue recordings. In the case where the priority rating is indicative of a value ranging from 1 to 0, the candidate dialogue recordings can be ranked according to a magnitude of the value associated with the first priority rating. Similarly, the selection circuitry 130 may assign the second priority rating (or third priority rating, or fourth priority rating and so on) to each of the respective candidate dialogue recording and order the candidate dialogue recordings with respect to each other on the basis of the second priority ratings.

In some cases, the selection circuitry 130 can assign two or more priority ratings (e.g. first and second priority ratings, first and third priority ratings, second and fourth priority ratings and so on) to each respective candidate dialogue recording and order the candidate dialogue recordings with respect to each other on the basis of at least one of the two or more priority ratings. In the case where the first priority rating and second priority rating are assigned to each candidate dialogue recording, there are two possibilities for ranking the candidate dialogue recordings according to their level of priority. In one case, the selection circuitry 130 can calculate a confidence score for each candidate dialogue recording in dependence upon both the first priority rating and the second priority rating and use the confidence score associated with each candidate dialogue recording to order the candidate dialogue recordings. In another case, the selection circuitry 130 can determine which of the two priority ratings for a candidate dialogue recording has a higher level of priority and use the priority rating having the highest level of priority for each of the candidate dialogue recordings to define an ordering. For example, when the first and second priority ratings are assigned to each candidate dialogue recording and are both indicative of a value ranging from 0 to 1, the selection circuitry 130 can select the priority rating having the largest value (in this example, it is assumed that a larger value for the priority rating corresponds to a higher level of priority) and then use the priority rating having the largest value to rank the candidates.

Whilst the above examples have been described with reference to a priority rating indicative of a numerical value in a given range, in some cases the priority rating may instead be indicative of a classification from a plurality of classifications. For example, for the first priority rating, a number of respective words indicated by the comparison data that are present in the text data for a given candidate dialogue recording can be detected and the selection circuitry 130 can be configured to assign the first priority rating indicative of a classification from a plurality of classifications to the given candidate dialogue recording in dependence upon whether the number of respective words indicated by the comparison data that are present in the text data for the given candidate dialogue recording is greater than a threshold number of words. The threshold number of words can be set to any suitable value. For example, the threshold number of words may be set to a value of 2 so that the first priority rating has a first classification indicative of a high level or priority for a candidate dialogue recording for which the text data includes more than 2 of the words indicated by the comparison data and the first priority rating has a second classification indicative of a low level or priority for a candidate dialogue recording for which the text data includes just 1 of the words indicated by the comparison data. It will be appreciated that a plurality of different threshold numbers may be used (e.g. a first threshold number of words and a second threshold number of words) so that a plurality of classifications (e.g. high priority, intermediate priority, low priority) can be used for the first priority rating.

Similarly, for the second priority rating, a number of respective words in text data for a given candidate dialogue recording that match the text data for a current dialogue recording can be used to assign the second priority rating, where the second priority rating is indicative of a classification from a plurality of classifications. The selection circuitry 130 can be configured to assign the second priority rating indicative of a classification from a plurality of classifications to the given candidate dialogue recording in dependence upon whether the number of matching words included in the text data for the given candidate dialogue is greater than a threshold number of matching words. For example, the threshold number of matching words may be set to a value of 10 so that the second priority rating has a first classification indicative of a high level of priority for a candidate dialogue recording for which the text data includes more than 10 respective words that each have a match in the text data for the current dialogue recording, and the second priority rating has a second classification indicative of a low level of priority for a candidate dialogue recording for which the text data includes 10 or fewer respective words that each have a match in the text data for the current dialogue recording. It will be appreciated that a plurality of different threshold numbers may be used and that a plurality of classifications (e.g. high priority, intermediate priority, low priority) can be used for the second priority rating.

Similarly, in relation to the fourth priority rating, the selection circuitry 130 can be configured to evaluate a difference between the two calculated word rates with respect to one or more thresholds and assign a fourth priority rating to a candidate dialogue recording indicative of a classification from a plurality of classifications. In relation to the firth priority rating, the selection circuitry 130 can be configured to evaluate a magnitude of the difference between the two detected amplitudes with respect to one or more thresholds and assign a fifth priority rating to a candidate dialogue recording indicative of a classification from a plurality of classification.

In embodiments of the disclosure, the selection circuitry 130 is configured to: select a plurality of candidate dialogue recordings in dependence upon the comparison data; calculate a confidence score for each of the plurality of candidate dialogue recordings; and select a candidate dialogue recording having a highest confidence score, wherein the confidence score for a candidate dialogue recording is dependent upon one or more of the priority ratings assigned to that candidate dialogue recording. The selection circuitry 130 can calculate a confidence score for a candidate dialogue recording, where the confidence score is dependent upon at least some of the priority ratings assigned to the candidate dialogue recording. In a simplest case in which a single priority rating is assigned to a candidate dialogue recording, the confidence score may be equal to a value associated with the single priority rating. For the case in which two or more priority ratings are assigned to a candidate dialogue recording, the selection circuitry 130 can calculate a confidence score for the candidate dialogue recording in dependence upon each of the priority ratings. As such, the confidence score for a candidate dialogue recording is indicative of an overall level of priority for the candidate dialogue recording that is dependent upon each of the priority ratings assigned to the candidate dialogue recording. For example, in a case in which the first, second and third priority ratings are assigned to a candidate dialogue recording, the confidence score may be calculate by summing a value associated with each of the priority ratings (confidence score=P1+P2+P3, where P1, P2 and P3 are values associated with the first, second and third priority ratings, respectively). Alternatively, the confidence score may be calculate by summing a value associated with each of the priority ratings, where the value associated with one or more of the priority rating is weighted using a weighting factor. For example, a first weighting factor may be used for the first priority rating to either decrease or increase a relative contribution of the first priority rating to the calculated confidence score such that the following calculation may be used to calculate the confidence score: confidence score=(P1*W1)+P2+P3, where W1 is a weighting parameter used for the first priority rating. For example, in the case where an amount of processing required for modifying the audio data for the current dialogue recording is a particular concern for a developer, a weighting parameter can be set for the first priority rating so as to give the first priority rating a larger weighting than the other priority ratings so that candidate dialogue recordings including more of the respective words indicated by the comparison data have a larger confidence score than candidate dialogue recordings including fewer of the respective words indicated by the comparison data. Weighting parameters may or may not be used for any of the priority ratings and the weighting parameters can be freely set to allow one or more of the priority ratings to have a greater contribution to the confidence score than other priority ratings.

Therefore, the plurality of candidate dialogue recording selected by the selection circuitry 130 on the basis of the comparison data can be ordered with respect to each other in dependence upon their associated confidence scores and the candidate dialogue recording having the highest confidence score, and thus the highest degree of overall suitability for use in modifying the audio data for the current dialogue recording, can be selected and a portion of the audio data for the selected candidate dialogue recording can be used by the recording circuitry 140 to modify one or more portions of the audio data for the current dialogue recording.

For example, in some circumstances it may be beneficial to give the third priority rating a more significant weighting than the other priority ratings. As explained previously, a candidate dialogue recording having been assigned the third priority rating includes two sequential words that match two sequential words in the predetermined text data, where audio data for one of the two sequential words is missing from the current dialogue recording. As such, the candidate dialogue recording having been assigned the third priority rating can be particularly useful for obtaining audio data for a word that has a high likelihood of having a pronunciation that sounds appropriate for the a phrase in the predetermined text data. Therefore, the candidate dialogue recordings can be evaluated on the basis of each of the assigned priority ratings and a more significant weighting may be provided for the third priority rating. Alternatively or in addition, in some circumstances it may be beneficial to give the sixth priority rating a more significant weighting than the other priority ratings so as to preferentially select, from a plurality of candidate dialogue recordings, a candidate dialogue recording having a similar voice pitch to the voice pitch of the current dialogue recording.

As explained previously, the priority rating may take the form of data indicative of a classification from a plurality of classifications rather than indicating a numerical value. The priority rating may for example indicate one of a first classification (high priority) and a second classification (low priority). The number of possible classifications associated with a given priority rating is not particularly limited and can be any integer value greater than or equal to two. In the case where the priority rating comprised data indicative of a classification, the selection circuitry 130 can be configured to associate a numerical value with each of the classifications and use the value associated with a classification when calculating the confidence score for the dialogue recording. As such, in some examples, the selection circuitry 130 can assign a plurality of respective priority ratings to a candidate dialogue recording, in which one or more of the respective priority ratings is indicative of a numerical value and one or more of the respective priority ratings is indicative of a classification from a plurality of classifications, and the confidence score can be calculated for the candidate dialogue recording in dependence upon each of the respective priority ratings.

In embodiments of the disclosure, the recording circuitry 140 is configured to insert a portion of the audio data for a candidate dialogue recording into the audio data for the current dialogue recording, the portion of the audio data for the candidate dialogue recording corresponding to a respective word indicated by the comparison data to be present in a sequence of respective words in the predetermined text data and not present in a sequence of respective words in the text data for the current dialogue recording. The recording circuitry 140 is configured to modify at least a portion of the audio data for a dialogue recording in dependence upon the audio data for one or more of the candidate dialogue recordings to obtain modified audio data and to store the modified audio data for the dialogue recording. The recording circuitry 140 can modify the audio data for a current dialogue recording by: inserting (adding) a portion of the audio data for a candidate dialogue recording into the audio data for the current dialogue recording; removing a portion of the audio data for the current dialogue recording; and/or replacing a portion of the audio data for the current dialogue recording with a portion of the audio data for the candidate dialogue recording. The recording circuitry 140 can copy a portion (segment) of the audio data for a candidate dialogue recording beginning at a first respective time Ta and ending at a second respective time Tb and insert (incorporate) the copied portion into the current dialogue recording so that the overall duration of the audio data for the current dialogue recording is increased by an amount of time corresponding to the difference between Ta and Tb such that audio data for an additional word is thereby included in the audio data for the current dialogue recording. The recording circuitry 140 can also remove a portion (segment) of the audio data for the current dialogue recording by cutting out a portion beginning at a first respective time and ending at a second respective time so that the audio data for the current dialogue recording is shortened by an amount of time corresponding to the difference between the two respective times. Similarly, the recording circuitry 140 can also replace a portion (segment) of the audio data for the current dialogue recording by selecting a portion of the audio data for the current dialogue recording beginning at a time Ta and ending at a time Tb, selecting a portion of the audio data for the candidate dialogue recording beginning at a time Tc and ending at a time Td, and replacing the portion from Ta to Tb with the portion from Tc to Td by removing the portion from Ta to Tb and inserting the portion from Tc to Td, where the two portions are typically expected to be different in duration but may in some cases have substantially the same duration.

The comparison data is indicative of one or more differences between the sequence of respective words for the current dialogue recording and a sequence of respective words in the predetermined text data. As such, the comparison data provides an indication of one or more portions of the current dialogue recording which require modification to match the predetermined text data. In the case where the current dialogue recording is missing a single word in a sequence of respective words in comparison to the predetermined text data, the audio data for the current dialogue recording can be modified to include an additional portion that includes the respective word that is missing from the current dialogue recording thereby obtaining modified audio data that includes a sequence of words matching a sequence of words in the predetermined text data. In some examples, a current dialogue recording may be missing two respective words with respect to the predetermined text data, such that a first additional portion of audio data can be inserted at a first respective time for the audio data for the current dialogue recording to add the first missing word and a second additional portion of audio data can be inserted at a second respective time for the audio data for the current dialogue recording to add the second missing word. The audio data for the first missing word and the second missing word may be obtained from a same candidate dialogue recording. Alternatively, the audio data for the first missing word and the second missing word may be obtained from different candidate dialogue recordings. Hence more generally, a current dialogue recording may be missing Z respective words, where Z is an integer that is greater than or equal to 1, and the recording circuitry 140 can obtain Z portions of audio data from one or more candidate dialogue recordings for insertion at respective times in the audio data for the dialogue recording.

Figure 3:
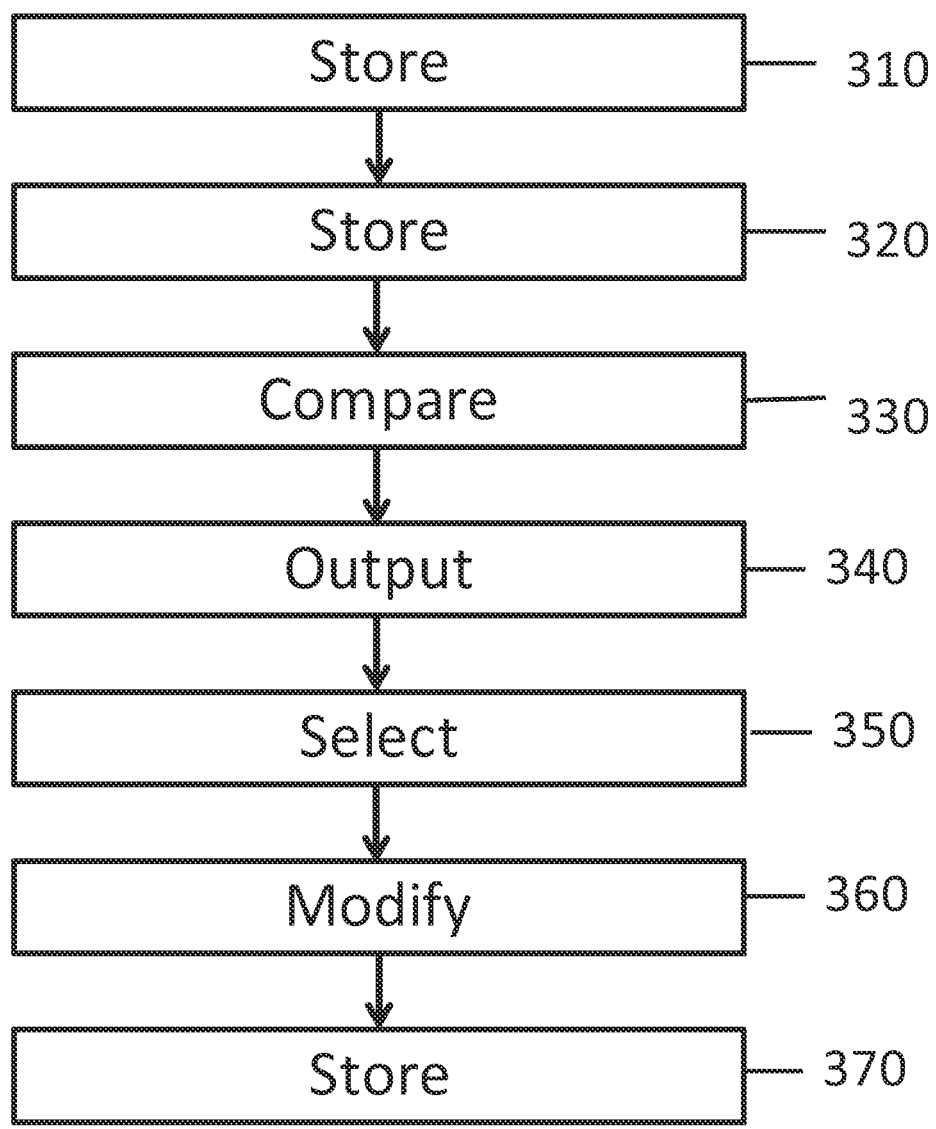
FIG. 3 is a schematic flowchart illustrating a data processing method.

Referring now to FIG. 3, in embodiments of the disclosure a data processing method comprises:
storing (310) audio data for a plurality of respective dialogue recordings for a content;
storing (320) text data indicative of a sequence of respective words within the audio data for each of the plurality of respective dialogue recordings;
comparing (330) the text data for a current dialogue recording with predetermined text data for the content;
outputting (340) comparison data for the current dialogue recording, the comparison data indicative of one or more differences between the text data for the current dialogue recording and the predetermined text data;
selecting (350) one or more candidate dialogue recordings from the plurality of respective dialogue recordings for the content in dependence upon the comparison data;
modifying (360) at least a portion of the audio data for the current dialogue recording in dependence upon the audio data for one or more of the candidate dialogue recordings to obtain modified audio data; and storing (370) the modified audio data for the current dialogue recording.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus, comprising:
storage circuitry to store a plurality of respective audio recordings for a content and to store text data indicative of respective sequences of words within each of the plurality of respective audio recordings;
analysis circuitry to:
compare, by the analysis circuitry, a sequence of words indicated by the text data for a current audio recording with predetermined text data for the content to detect whether the sequence of words is present in the predetermined text data,
if the sequence of words is present in the predetermined text data, determine that the current audio recording comprises a correct recital of the predetermined text data and that modification of the current audio recording is not required, and
if the sequence of words is not present in the predetermined text data, determine that the current audio recording does not comprise a correct recital of the predetermined text data and output comparison data for the current audio recording, the comparison data indicative of a plurality of respective words that are missing from the current audio recording in comparison to the predetermined text data;
selection circuitry to:
select one or more candidate audio recordings from the plurality of respective audio recordings for the content in dependence upon the comparison data so that each of the one or more candidate audio recordings includes at least one of the plurality of respective words that are missing from the current audio recording;
assign one or more priority ratings to each of the one or more candidate audio recordings in dependence upon one or more properties associated with at least one of the candidate audio recording and the text data for the candidate audio recording, wherein the one or more priority ratings include a first priority rating indicative of how many of the plurality of respective words that are missing from the current audio recording are present in each of the one or more candidate audio recordings;
rank the one or more candidate audio recordings based on the one or more priority ratings; and
select a candidate audio recording from the one or more candidate audio recordings according to the ranking; and
recording circuitry to:
modify at least a first portion of the current audio recording to include at least a second portion of the selected candidate audio recording obtain a modified audio recording; and
store the modified audio recording for the current audio recording.

2. The data processing apparatus according to claim 1, wherein the analysis circuitry is configured to detect a sequence of respective words in the predetermined text data having a highest degree of match with the text data for the current audio recording in dependence upon the comparison of the text data for the current audio recording with the predetermined text data.

3. The data processing apparatus according to claim 2, wherein the comparison data is indicative of one or more of the respective words present in the sequence of respective words in the predetermined text data having the highest degree of match that are not present in the sequence of words in the text data for the current audio recording.

4. The data processing apparatus according to claim 1, wherein the analysis circuitry is configured to compare each of the plurality of respective audio recordings for the content with the predetermined text data for the content and to assign a match score to each of the plurality of respective audio recordings, wherein the match score for a given audio recording is indicative of a degree of match between the sequence of words in the text data for the given audio recording and the sequence of respective words in the predetermined text data, and wherein the analysis circuitry is configured to select an audio recording having a highest match score as the current audio recording.

5. The data processing apparatus according to claim 1, wherein the selection circuitry is configured to assign a second priority rating to each of the one or more candidate audio recording in dependence upon a number of respective words included in the text data for the candidate audio recording that match a respective word included in the text data for the current audio recording.

6. The data processing apparatus according to claim 1, wherein the selection circuitry is configured to:
- detect, in a sequence of words included in the predetermined text data, a respective word that is adjacent to a respective word indicated by the comparison data;
- detect, in a sequence of words included in the text data for a candidate audio recording of the one or more candidate audio recordings, a respective word that is adjacent to a respective word indicated by the comparison data; and
- assign a third priority rating to the candidate audio recording in dependence upon whether the detected respective words match each other.

7. The data processing apparatus according to claim 1, wherein the selection circuitry is configured to calculate a number of words per unit time for both the candidate audio recording and the current audio recording and to assign a fourth priority rating to the candidate audio recording in dependence upon a magnitude of a difference between the number of words per unit time for the candidate audio recording and the current audio recording.

8. The data processing apparatus according to claim 1, wherein the selection circuitry is configured to detect, for both the candidate audio recording and the current audio recording, an amplitude of an audio signal in the audio recording and to assign a fifth priority rating to the candidate audio recording in dependence upon a magnitude of a difference between the detected amplitudes.

9. The data processing apparatus according to claim 1, wherein the selection circuitry is configured to detect, for both the candidate audio recording and the current audio recording, a pitch of a voice in the audio recording and to assign a sixth priority rating to the candidate audio recording in dependence upon a magnitude of a difference between the detected pitches.

10. The data processing apparatus according to claim 1, wherein the selection circuitry is configured to:
- calculate a confidence score for each of the plurality of candidate audio recordings;
wherein;
- the confidence score for a candidate audio recording is dependent upon one or more of the priority ratings assigned to that candidate audio recording; and
- selecting the candidate audio recording from the one or more candidate audio recordings according to the ranking comprises selecting the candidate audio recording having the highest confidence score.

11. The data processing apparatus according to claim 1, wherein the second portion of the selected candidate audio recording includes a respective word of the plurality of respective words that are missing from the current audio recording.

12. The data processing apparatus according to claim 1, wherein the analysis circuitry is configured to generate the text data for each of the plurality of respective audio recordings from each respective audio recording.

13. The data processing apparatus according to claim 1, wherein the plurality of respective audio recordings each correspond to a same voice actor.

14. The data processing apparatus according to claim 1, wherein the predetermined text data for the content includes at least one sequence of respective words, and wherein the sequence of respective words is updatable in response to a user input.

15. A data processing method comprising:
- storing a plurality of respective audio recordings for a content;
- storing text data indicative of respective sequences of words within each of the plurality of respective audio recordings;
- comparing a sequence of words indicated by the text data for a current audio recording with predetermined text data for the content;
- outputting, based on the comparing, comparison data for the current audio recording, the comparison data indicative of a plurality of respective words that are missing from the current audio recording in comparison to the predetermined text data;
- selecting one or more candidate audio recordings from the plurality of respective audio recordings for the content in dependence upon the comparison data so that each of the one or more candidate audio recordings includes at least one of the plurality of respective words that are missing from the current audio recording;
- assigning one or more priority ratings to each of the one or more candidate audio recordings in dependence upon one or more properties associated with at least one of the candidate audio recording and the text data for the candidate audio recording, wherein the one or more priority ratings include a first priority rating indicative of how many of the plurality of respective words that are missing from the current audio recording are present in each of the one or more candidate audio recordings;
- ranking the one or more candidate audio recordings according to the one or more priority ratings;
- selecting a candidate audio recording from the one or more candidate audio recordings according to the ranking;
- modifying at least a first portion of the current audio recording to include at least a second portion of the selected candidate audio recording to obtain a modified audio recording; and
- storing the modified audio recording for the current audio recording.

16. A non-transitory, computer readable storage medium containing computer software which, when executed by a computer, causes the computer to perform a data processing method comprising the steps of:
- storing for a plurality of respective audio recordings for a content;
- storing text data indicative of respective sequences of words within each of the plurality of respective audio recordings;

comparing a sequence of words indicated by the text data for a current audio recording with predetermined text data for the content to detect whether the sequence of words is present in the predetermined text data;

if the sequence of words is present in the predetermined text data, determining that the current audio recording comprises a correct recital of the predetermined text data and that modification of the current audio recording is not required;

if the sequence of respective words is not present in the predetermined text data:

determining that the current audio recording does not comprise a correct recital of the predetermined text data and outputting comparison data for the current audio recording, the comparison data indicative of differences between the text data for a plurality of respective words that are missing from the current audio recording in comparison to the predetermined text data;

selecting one or more candidate audio recordings from the plurality of respective audio recordings for the content in dependence upon the comparison data so that each of the one or more candidate audio recordings includes at least one of the plurality of respective words that are missing from the current audio recording;

assigning one or more priority ratings to each of the one or more candidate audio recordings in dependence upon one or more properties associated with at least one of the candidate audio recording and the text data for the candidate audio recording, wherein the one or more priority ratings include a first priority rating indicative of how many of the plurality of respective words that are missing from the current audio recording are present in each of the one or more candidate audio recordings;

ranking the one or more candidate audio recordings according to the one or more priority ratings;

selecting a candidate audio recording from the one or more candidate audio recordings according to the ranking;

modifying at least a first portion of the current audio recording to include at least a second portion of the selected candidate audio recording to obtain a modified audio recording; and storing the modified audio recording for the current audio recording.

\* \* \* \* \*